United States Patent [19]

Shimojo

[11] 3,728,509

[45] Apr. 17, 1973

[54] PUSH-BUTTON SWITCH WITH RESILIENT CONDUCTIVE CONTACT MEMBER WITH DOWNWARDLY PROJECTING RIDGES

[75] Inventor: Takemi Shimojo, Tokyo, Japan

[73] Assignee: Alps Electric Co., Ltd., Tokyo Japan

[22] Filed: Aug. 18, 1971

[21] Appl. No.: 172,637

[30] Foreign Application Priority Data

Sept. 26, 1970 Japan ........................................45/95868
Sept. 26, 1970 Japan ........................................45/95869
Oct. 12, 1970 Japan ........................................45/101247

[52] U.S. Cl. .......200/159 B, 200/166 C, 200/166 BH
[51] Int. Cl. ........H01h 13/52, H01h 1/04, H01h 1/06
[58] Field of Search ........................200/159 B, 159 R, 200/16 A, 166 CP, 166 C, 166 H, 166 BH, 83 N, 153 W, 86 R

[56] References Cited

UNITED STATES PATENTS

| | | | |
|---|---|---|---|
| 3,602,677 | 8/1971 | Adelson et al. | 200/159 B X |
| 3,437,973 | 4/1969 | Mabbett | 200/86 X |
| 2,848,920 | 8/1958 | Lester | 200/166 C X |
| 3,207,905 | 9/1965 | Bray | 200/159 R X |
| 2,528,035 | 10/1950 | Clayton | 200/153 W X |
| 3,485,974 | 12/1969 | Wolf et al. | 200/166 BH X |

OTHER PUBLICATIONS

"Key Matrix Using A Fluid Medium"; Cook et al.; IBM Technical Disclosure Vol. 13, No. 3, p. 744; Aug., 1970.

*Primary Examiner*—Robert K. Schaefer
*Assistant Examiner*—Robert A. Vanderhye
*Attorney*—Maxwell James et al.

[57] ABSTRACT

A push-button switch comprises a substrate on which two conductive networks are formed, those networks comprising adjacent but separated conductive paths, a push-button member with a contact member thereon being mounted on the substrate with the contact member normally above and in registration with the separated conductive paths. The contract member is formed of elastic and electrically conductive material and is adapted when it is pushed down via the push-button member to engage the substrate, and hence the separated conductive paths, over an appreciable area, thereby ensuring effective switch operation.

12 Claims, 15 Drawing Figures

INVENTOR.
TAKEMI SHIMOJO
BY James and Franklin
ATTORNEYS

INVENTOR.
TAKEMI SHIMOJO
BY
James and Franklin
ATTORNEYS

PUSH-BUTTON SWITCH WITH RESILIENT CONDUCTIVE CONTACT MEMBER WITH DOWNWARDLY PROJECTING RIDGES

This invention relates to a push-button switch particularly adapted for manual operation which is of extremely simple construction and yet which has exceptionally good operating characteristics.

Push-button switches are known in which separated conductive portions are adapted to be bridged by a conductive element which is pressed down when the switch is actuated, thereby to electrically connect the two conductive portions. The nature and quality of the electrical connection is dependent upon the particular nature of the physical engagement which occurs when the push-button is actuated. Generally proper physical engagement occurs only when the push-button is actuated in precisely the proper manner, for example, when the manually operated member is pushed in precisely the proper direction. If it is pushed obliquely to that proper direction, the bridging element may make only practically effective connection between the conductive paths on the substrate and in some instances no electrical connection at all may occur. Even when proper electrical connection is made, the "feel" of the pushbutton switch may be unpleasant, something which is of considerable importance when the switches are incorporated into consumer-oriented apparatus such as communications receivers. In some instances the electrical connection made may be intermittent or discontinuous because of the physical relationships between the parts and the precise manner in which the switch is manually actuated. The switch may also be susceptible to damage if excessive force is applied to it.

As a result, push-button switch structures are often surprisingly complex, with means provided for guiding the movable parts in an effort to ensure that switch engagement occurs properly. These approaches involve appreciable expense, and even then are of only limited effectiveness. They have, however, been used because the prior art simple structures are of considerably lesser effectiveness.

It is the prime object of the present invention to provide a push-button switch which avoids the above disadvantages, which is extremely simple and inexpensive in construction yet which is exceptionally effective in electrical function.

It is another object of the invention to devise such a switch which is capable of rapid and inexpensive manufacture and assembly.

It is another object of the present invention to devise a push-button switch which occupies little space, which is formed of a minimal number of parts, and which is virtually fool-proof insofar as operative manipulation is concerned.

It is yet another object of the present invention to provide a push-button switch which is exceedingly reliable in operation.

To these ends, the switch comprises a substrate on which two conductive networks are formed, those networks comprising adjacent but separated conductive paths, appropriate terminals being connected to each of those networks. A resilient push-button member is operationally mounted on the substrate so as normally to assume a first position relatively remote from the substrate but which is resiliently movable to a second position closer to the substrate. That push-button member, preferably in the form of a shaped sheet of resilient insulating material, carries on its underside a contact member which is formed of elastic and electrically conductive material, such as conductive rubber. That contact member is held separated from the substrate when the push-button member is in its first position but when the push-button member is moved to its second position the resilient contact member is moved down into engagement with the substrate and the separated conductive paths thereof. The contact member engages those conductive paths, and bridges the separation between them, over an appreciable area, whether the push-button member is pushed directly down or obliquely. As a result, extremely effective electrical connection is achieved through the switch upon the actuation of the push-button member in virtually any direction. The fact that the contact member is not only electrically conductive but is also elastically compressible ensures effective operative engagement between the contact member and the conductive paths under all conditions of operation. The "feel" of the switch is greatly enhanced, and "chattering" is virtually eliminated.

Exceptionally high degrees of reliability and effectiveness of operation are achieved by forming the conductive paths in a plurality of interdigitated portions extending generally in a given direction and by providing the contact member with lands or raised portions adapted to engage and bridge the conductive interdigitations, those lands being oriented substantially at right angles to the direction in which the interdigitated portions extend. Further effectiveness of operation is achieved if one or both of the conductive paths and the lands are formed with a tapering cross-section.

The push-button member may be provided with a rim portion adapted to be secured directly to the substrate, by adhesive and/or, in a preferred form, by means of fasteners which are preferably embedded in the rim portion and which extend through the substrate, engaging the substrate on its undersurface. The substrate may readily be provided with preformed apertures for the reception of such fasteners.

To the accomplishment of the above, and to such other objects as may hereinafter appear, the present invention relates to the construction of a push-button type of switch as defined in the appended claims and as described in this specification, taken together with the accompanying drawings, in which FIG. 1 is a cross-sectional view of a first embodiment of the push-button switch of the present invention;

Figure 1:
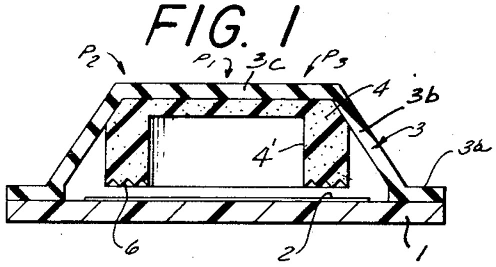
Figure 2:
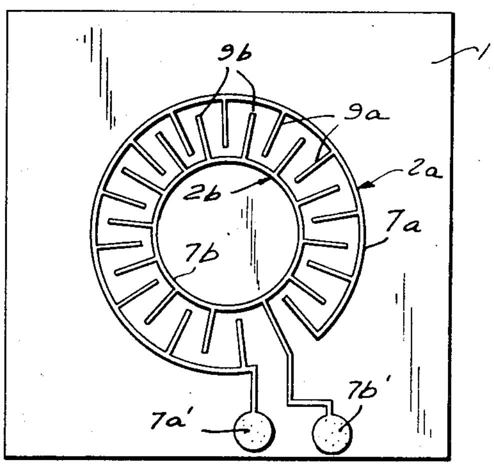
FIG. 2 is a top plan view of the substrate of the switch of FIG. 1.
Figure 3:
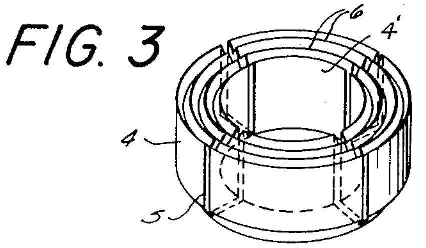
FIG. 3 is a three-quarter perspective view, inverted, of the contact member in the embodiment of FIG. 1.

Referring first to the embodiment of FIGS. 1–3, the substrate 1 may be formed of any suitable insulating material, and it carries thereon a pair of conductive networks 2*a* and 2*b*, each of those networks comprising adjacent but separated conductive paths, as may best be seen from FIG. 2. The network 2*a* comprises an outer arcuate terminal portion 7*a* extending to a terminal post area 7*a*', fingers 9*a* extending generally radially inwardly from arcuate terminal portion 7*a*. The network 2*b* comprises a substantially circular terminal portion 7*b* connected to terminal post portion 7*b*', and with fingers 9*b* extending generally radially outwardly therefrom into the spaces between the fingers 9*a*. The conductive networks 2*a* and 2*b* may be applied to the substrate 1 in any appropriate manner, as through conventional printed circuit techniques.

The push-button member 3, formed of appropriate resilient insulating material such as rubber or comparable synthetic material, comprises a rim portion 3*a* which is secured to the substrate 1 in any appropriate manner, as by means of adhesive, a main portion 3*b* located above and in registration with the conductive networks 2*a* and 2*b*, and an intermediate portion 3*c* connected between the rim portion 3*a* and the main portion 3*b* and effective normally to resiliently retain the main portion 3*b* in a first operative position as shown in FIG. 1, spaced upwardly from but in registration with the conductive networks 2*a* and 2*b* on the upper surface of the substrate 1.

Carried by the main portion 3*b* of the push-button member 3 is a contact member 4 which is formed of a suitable resilient material which is also electrically conductive. Electrically conductive silicone rubber is particularly effective, but any other material having the desired characteristics can be used. The contact member 4 may be secured to the main portion 3*b* of the push-button member 3 in any appropriate manner, as through the use of a suitable adhesive. It depends from the main portion 3*b* of the push-button member 3, and when the push-button member 3 is in its first position the lower surface of the contact member 4 is normally spaced upwardly from the conductive networks 2 so as to be out of engagement therewith, as shown in FIG. 1. However, when the main portion 3*b* of the push-button member 3 is depressed to its second operative position the contact member 4 will be carried down into engagement with the fingers 9*a* and 9*b* of the networks 2*a* and 2*b* respectively, thereby to physically and electrically bridge the space between those fingers and complete the circuit between the networks 2*a* and 2*b*, thus electrically closing the switch. Because of the resilient nature of the material of which the contact member 4 is formed, effective electrical connection between the networks 2*a* and 2*b* will be achieved whether the push-button member 3 is pushed directly down, in the direction of the arrow P1 in FIG. 1,or obliquely, as indicated by arrows P2 and P3 in FIG. 1. Moreover, the design of the switch, coupled with the resilient nature of the contact member 4, ensures that effective contact member engagement is achieved over an appreciable area, that area increasing as the depressive force exerted on the push-button increases, but without any likelihood of damage to the switch parts.

As is shown in FIGS. 1 and 3, the surface of the contact member 4 facing the conductive networks 2*a* and 2*b* may be provided with lands or downwardly projecting parts 6, preferably substantially triangular in cross-section and tapering downwardly toward the substrate. These parts 6 are preferably oriented to extend in a direction substantially perpendicular to the extension directions of the fingers 9*a* and 9*b*, and hence in the embodiment here specifically under discussion the parts 6 are generally arcuately oriented. The land construction improves the "feel" of the switch while effectively ensuring good electrical connection between the networks. The "feel" may be further enhanced by forming the contact member 4 with a central opening 4' and with slots 5 extending radially to that opening 4'.

Figure 5:
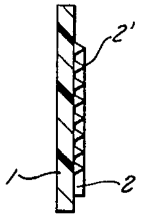
FIG. 5 is a side elevational view of the substrate of the embodiment of FIG. 4.
Figure 6:
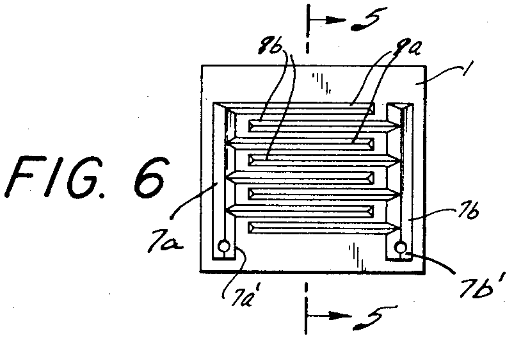
FIG. 6 is a top plan view of the substrate of the embodiment of FIG. 4.
Figure 7:
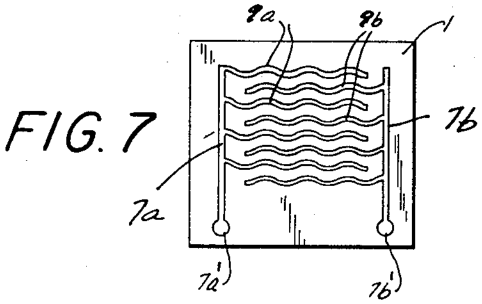
FIGS. 7 and 8 are top plan views.
Figure 8:
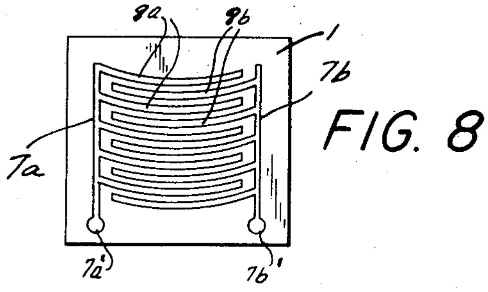
Figure 9:
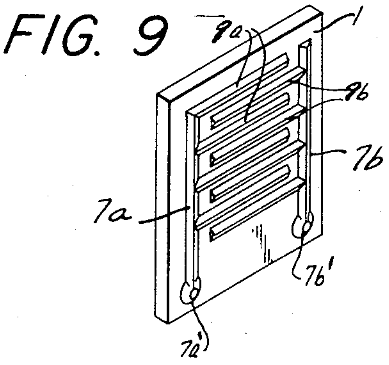
FIG. 9 is a three-quarter perspective view, of alternative substrates usable in the embodiment of FIG. 4.
Figure 10:
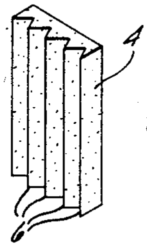
FIG. 10 is a three-quarter perspective view of the contact member of the embodiment of FIG. 4.

The constructions disclosed in FIGS. 4–10 are essentially similar to that shown in FIGS. 1–3, and comparable parts have comparable reference numerals applied thereto. In the embodiment of FIGS. 5 and 6 the networks 2*a* and 2*b* comprise laterally spaced terminal portions 7*a* and 7*b* respectively, with interdigitated horizontally extending fingers 9*a* and 9*b* respectively and, as may be seen from FIG. 5, with those fingers 9*a* and 9*b* formed as lands with an upwardly tapering substantially triangular cross-section, these land-like fingers 9*a* and 9*b* cooperating with the land-like protrusions 6 depending from the resilient conductive contact member 4*a* (see FIG. 10), the contact member 4*a* being so oriented that its lands 6 extend substantially at right angles to the land-like fingers of 9*a* and 9*b* of the conductive networks. This combination of lands against lands makes for an exceptionally soft feel almost entirely free of "chatter". The interdigitated fingers 9*a* and 9*b* of FIG. 6 are in the form of straight lines. In Fig. 7 they are shown in the form of mating undulated lines and in FIG. 8 in the form of mating arcuate lines. These are but exemplary of other configurations which could be employed.

Figure 11:
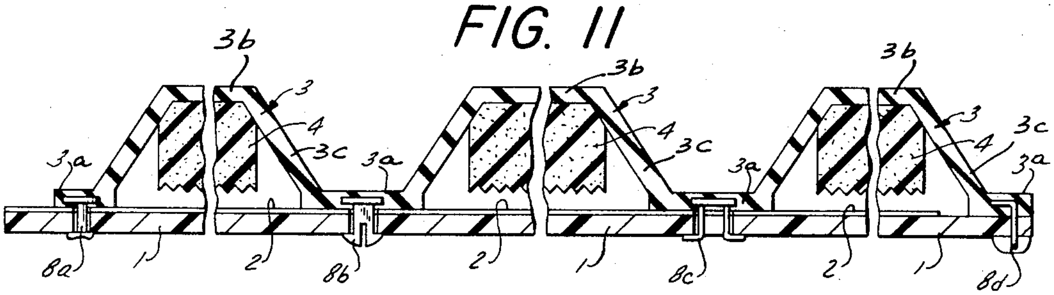
FIG. 11 is a cross-sectional view of a unitary assembly of a plurality of push-buttons of the type here disclosed and illustrating the use of fasteners to secure the push-button member to the substrate, four different fastener constructions being illustrated.
Figure 12A:
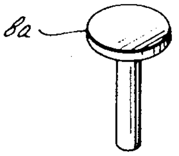
FIGS. 12A, B, C and D are three-quarter perspective views of the fastener elements shown in the four different places in FIG. 11.
Figure 12B:
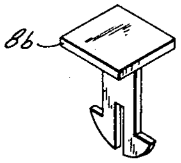
Figure 12C:
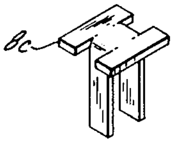
Figure 12D:
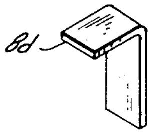
Figure 4:
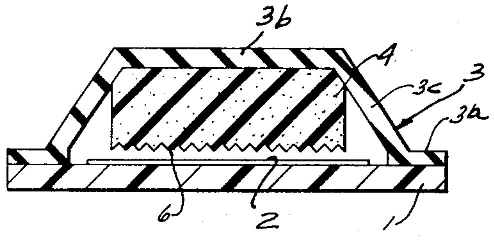
FIG. 4 is a cross-sectional view of a second embodiment of the instant invention.

The push-button construction of the present invention is particularly well adapted for the construction of an array of such push-buttons, as shown in FIG. 11. A single substrate 1 may be provided with a plurality of sets of conductive networks 2 and a one piece multiple push-button member 3 may be employed, the rim portions 3*a* of which are secured to the substrate in the spaces between the individual sets of conductive networks 2. Although a one piece multiple push-button member is utilized, each of the individual push-button switch assemblies, which may be constructed as in any previously described embodiments or their equivalents, are independently actuatable in accordance with the needs and desires of the user.

The embodiments of FIGS. 11–12 disclose an alternative method of securing the push-button member 3 to the substrate 1 which may be utilized with or without the use of adhesive, and in any of the constructions disclosed or their equivalents. Fasteners 8 may be secured to the rim portions 3*a* of the push-button member 3, preferably by having enlarged heads which are embedded in those rim portions 3*a* as by molding the rim portions 3*a* therearound. These fasteners are provided with downwardly extending portions adapted to pass through the substrate 1, which may be provided with preformed apertures 9 for that purpose, the fastener portions extending below the lower surface of the substrate 1 thereafter being appropriately deformed or otherwise treated so as to engage the lower substrate surface, thereby to retain the push-button member 3, and with it the contact member 4, in proper position. This arrangement makes for extreme speed and efficiency in assembling the device and therefore greatly reduces cost. The fastener 8*a* is designed to have the downwardly projecting end thereof upset in order to engage the undersurface of the substrate 1, the fastener 8*b* is provided with a resilient bifurcated downwardly extending portion which snaps into engagement with the substrate 1, the fastener 8*c* is of staple-shape, the downwardly extending portions thereof adapted to be bent along the undersurface of the substrate 1, while the fastener 8*d* has a downwardly extending portion which is adapted to be secured by dip-soldering or the like to an appropriately positioned metal segment on the undersurface of the substrate 1.

The construction in question is obviously simple and inexpensive. The conductive networks may be formed accurately, rapidly and inexpensively by printed circuit techniques. The push-button member 3 and contact member 4 need not be formed with any particularly high degree of precision, and they may be manufactured and assembled by mass production techniques. The affixation of the push-button member contact member assembly 3,4 to the substrate 1 need not be accomplished with any great degree of dimensional precision. Manipulation of the individual push-button switches can be rough and ready and yet the closing and opening of the switches will be very reliably effective. The "feel" of the switch is exceptionally good, "chattering" is virtually eliminated, and the application of excessive pressure to the switch will have no deleterious effects.

While but a limited number of embodiments of the present invention have been here specifically disclosed, it will be apparent that many variations may be made therein, all within the scope of the instant invention as defined in the following claims.

I claim:

1. A push-button switch comprising a substrate having an upper surface, two conductive networks on said surface comprising adjacent but separated conductive paths, a terminal connection to each of said networks, a push-button member operatively connected to said substrate, normally assuming a first position remote from said substrate upper surface and being resiliently movable to a second position closer to said substrate upper surface, and a contact member operatively connected to said push-button member and movable therewith between corresponding first and second positions respectively spaced from and engaging said substrate surface in registration with said networks, said contact member being made of soft pliable elastic and electrically conductive material and being provided with a series of linear downwardly projecting ridges on the surface thereof facing said substrate upper surface, said ridges being oriented substantially at right angles to those portions of said conductive paths with which they are in registration, said ridges thereby engaging said networks at a plurality of points, thereby to complete an electric circuit between said conductive paths when engaged with said networks.

2. The switch of claim 1, in which said conductive paths have a cross-section which tapers upwardly toward said contact member.

3. The switch of claim 2, in which said ridges have a cross-section which tapers downwardly toward said substrate.

4. The push-button switch of claim 1, in which said conductive networks each comprise an outside portion defining said terminal and a series of inwardly extending fingers, the fingers of the respective networks alternating with one another over said substrate upper surface.

5. The push-button switch of claim 4, in which said terminals comprise substantially concentric arcuate portions, said fingers extending generally radially inwardly and outwardly from their respective terminals.

6. The push-button switch of claim 4, in which said outside terminals comprise portions to one side and the other of said substrate upper surface, said fingers extending generally laterally in opposite directions from their respective terminal portions.

7. The push-button switch of claim 1, in which said contact member is made of silicone rubber.

8. The push-button switch of claim 1, in which said push-button member comprises a main portion to which said contact member is connected, a rim portion secured to said substrate, and an intermediate portion connected between said rim portion and said main portion and effective normally to maintain said contact member in said first position.

9. The push-button switch of claim 8, in which fastening members are carried by said rim portion and extend therefrom through said substrate and engage said substrate at the lower surface thereof, thereby to secure said rim portion to said substrate.

10. The push-button switch of claim 9, in which said fastening members comprise head portions embedded in said rim portions.

11. A push-button switch comprising a substrate having an upper surface, two conductive networks on said surface comprising adjacent but separated conductive paths, a terminal connected to each of said networks, a push-button member operatively connected to said substrate, normally assuming a first position remote from said substrate upper surface and being resiliently movable to a second position closer to said substrate upper surface, and a contact member operatively connected to said push-button member and movable therewith between corresponding first and second positions respectively spaced from and engaging said substrate surface in registration with said networks, said contact member being made of elastic and electrically conductive material and engaging said networks over an appreciable area, thereby to complete an electric circuit between said conductive paths when engaged with said networks, said push-button member comprising a main portion to which said contact member is connected, a rim portion secured to said substrate, and an intermediate portion connected between said rim portion and said main portion and effective normally to maintain said contact member in said first position, and fastening members carried by said rim portion and extending therefrom through said substrate and engaging said substrate at the lower surface thereof, thereby to secure said rim portion to said substrate.

12. The push-button switch of claim 11, in which said fastening members comprise head portions embedded in said rim portions.

* * * * *